Oct. 10, 1933.     W. H. BASELT     1,929,767
BRAKE ARRANGEMENT
Filed Oct. 1, 1928     2 Sheets-Sheet 1
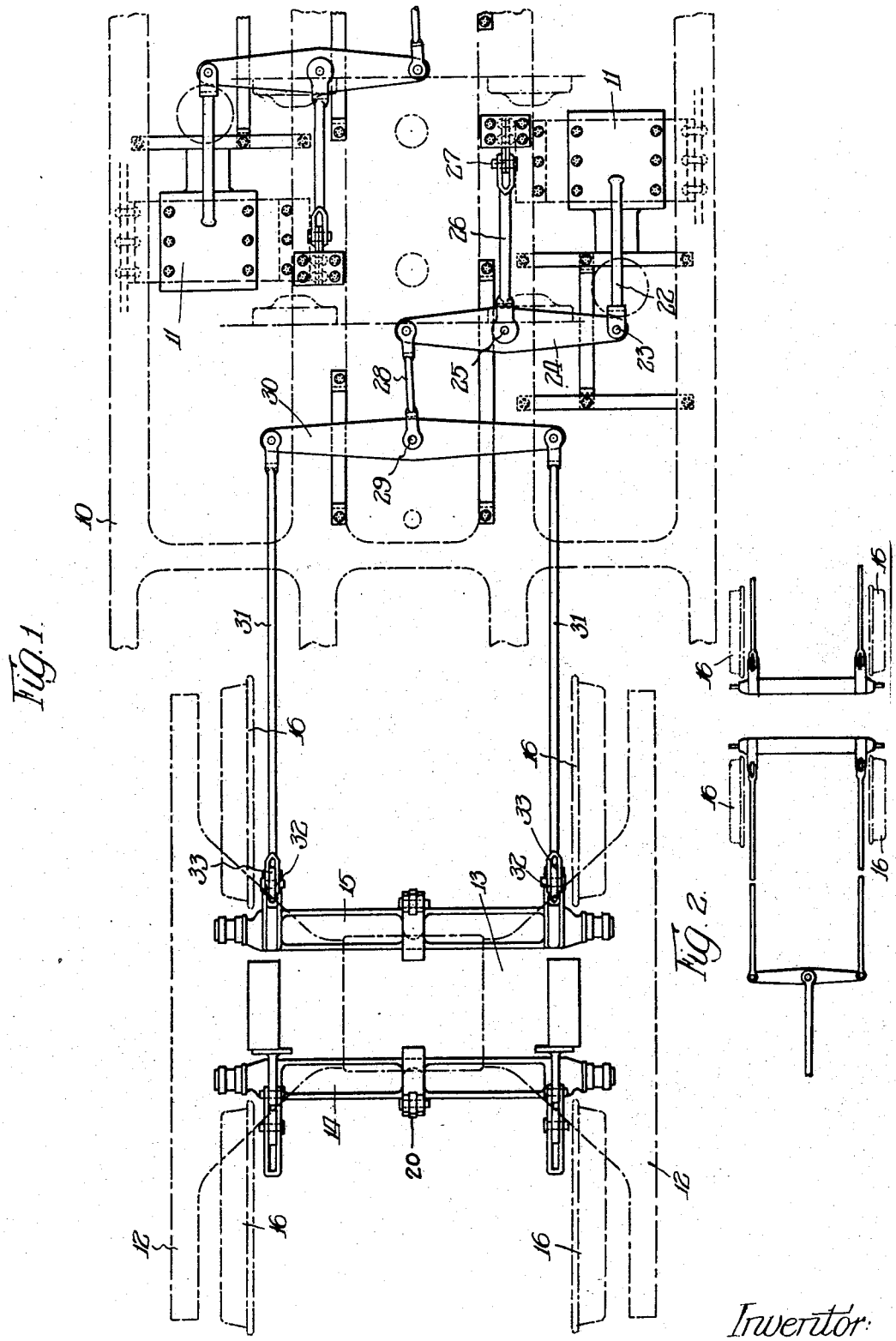
Inventor:
Walter H. Baselt,
By Wilkinson, Huxley, Byron & Knight
Attys.

Oct. 10, 1933.   W. H. BASELT   1,929,767
BRAKE ARRANGEMENT
Filed Oct. 1, 1928   2 Sheets-Sheet 2
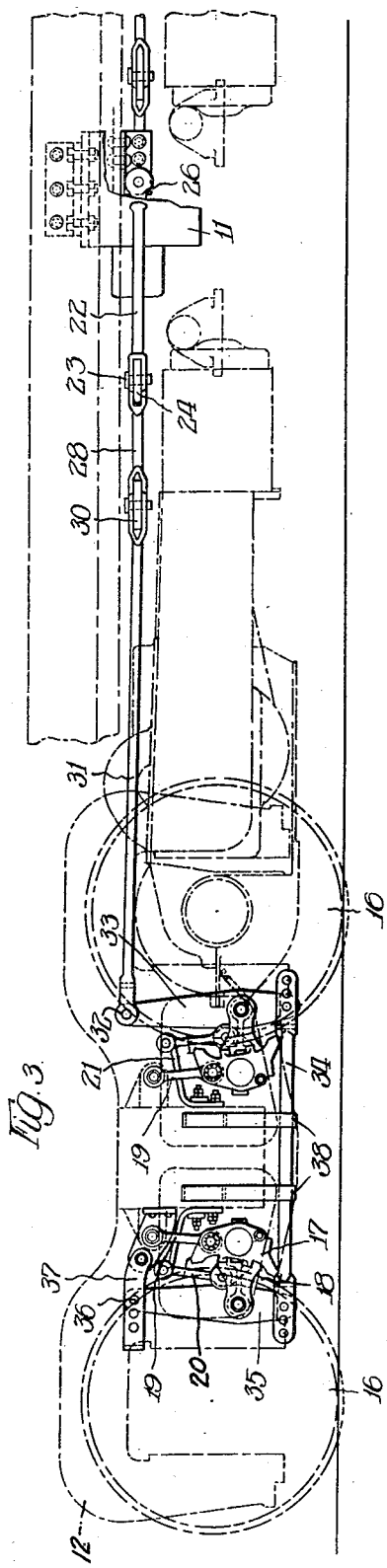
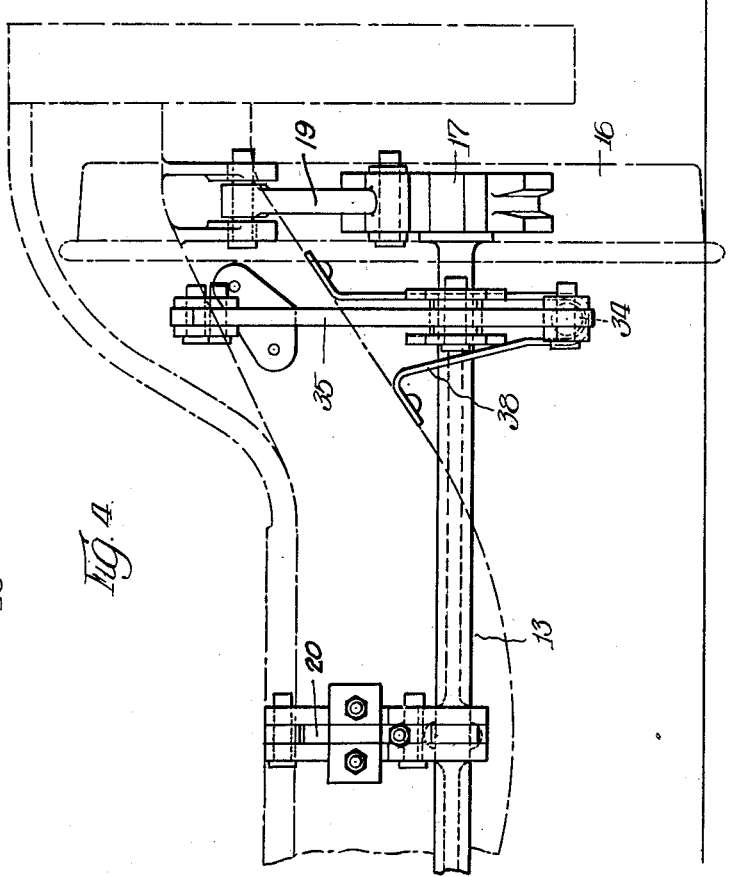
Inventor:
Walter H. Baselt,
By Wilkinson, Huxley, Byron & Knight
attys Patented Oct. 10, 1933

1,929,767

UNITED STATES PATENT OFFICE

1,929,767

BRAKE ARRANGEMENT

Walter H. Baselt, Chicago, Ill., assignor to American Steel Foundries, Chicago, Ill., a corporation of New Jersey Application October 1, 1928. Serial No. 309,509

9 Claims. (Cl. 188—33)

This invention relates to a brake arrangement for locomotive tenders.

One object of the invention is to provide a simple, durable and efficient brake mechanism in which the various parts cooperate to meet requirements under service conditions and including means for guiding certain of the brake connections in their operative movements and preventing their accidentally falling to the ground.

This and other objects of the invention are accomplished by means of the arrangement disclosed on the accompanying sheets of drawings, in which—

Figure 1 is a fragmentary top plan view of a locomotive tender frame with associated trucks and brake mechanism embodying my improvement;

Figure 2 is a similar view of the brake mechanism on a reduced scale and forming a continuation of the brake mechanism to the right of that shown in Figure 1;

Figure 3 is a fragmentary side elevation of the arrangement shown in Figure 1; and Figure 4 is a fragmentary end elevation of the same arrangement on a larger scale.

The various novel features of the invention will be apparent from the following description and drawings and will be particularly pointed out in the appended claims.

Referring to the figures of the drawings, it will be noted that the invention is disclosed in connection with a locomotive tender including a frame 10 which suitably supports and carries oppositely arranged brake cylinders 11 which are arranged symmetrically both transversely and longitudinally with respect to the center of said tender frame. Operatively connected in the usual manner (not shown in detail), with each end of the tender frame is a truck including a frame having side members 12 and a cross member 13 which connects the side members. Each truck in this particular instance is a four-wheel truck with brake beams 14 and 15 arranged on adjacent sides of adjacent pairs of wheels 16. Each of said brake beams carries brake heads 17 with brake shoes 18 which are adapted to engage the associated truck wheels 16.

The brake mechanism is supported in part by hangers 19 connected to the brake heads and to the truck frames and by intermediate or balance hangers 20 connected to the brake beams and brackets 21 in turn connected to the truck cross frame members 13. Each brake cylinder 11 is separately and independently connected to its associated brake mechanism for each of the trucks; that is to say, one brake cylinder 11 is separately and independently connected to one set of brakes at one end of the truck and the other brake cylinder is separately and independently connected to the brake mechanism for the truck at the opposite end of the tender frame.

In view of the fact that such brake mechanism is the same for each truck, only one set will be considered in detail. Each cylinder has its operating piston to which there is connected a rod 22 which is pivotally connected at 23 to one end of a cylinder lever 24 which at an intermediate point 25 is pivotally connected to a pull rod 26 anchored to the tender frame at 27. Pivotally connected to the opposite end of the cylinder lever 24 is a pull rod 28 which is pivotally connected at 29 to an equalizing lever 30. Pivotally connected to each end of the equalizing lever is one end of a pull rod 31, the opposite end of each of which is pivotally connected at 32 to the upper end of a brake lever 33. These brake levers 33 are operatively connected at an intermediate point to the brake beam 15. The lower end of each of the brake levers 33 is connected to one end of a brake push rod 34, the opposite end of which is connected to the lower end of another brake lever 35, the upper end of which is pivotally connected at 36 to a bracket 37 secured to the associated truck side frame 12. The intermediate points of the brake levers 35 are operatively connected to the associated brake beam 14. The brake levers 35 and 33 are arranged on adjacent sides of adjacent pairs of wheels of each of the trucks.

Referring particularly to Figures 3 and 4, it will be noted that U-shaped safety straps 38 are secured to the under side of the truck frame cross member 13 and that said straps loop or extend down under each of the push connecting rods 34 extending between the brake levers 33 and 35. There are two of these brake straps 38 spaced with respect to each other and supporting each of said connecting rods 34. Said straps 38 not only guide the connecting rods 34 in their operative movements but also prevent said brake rods and associated brake mechanism from accidentally falling to the ground when torn from their normal supporting hangings.

It will be appreciated that when the brakes are applied all of the brake rods between the cylinder lever 24 and truck brake levers 33 will be in tension and the connecting rods 34 between adjacent levers 33 and 35 of adjacent pairs of wheels will be in compression.

By means of this arrangement, the object of the invention is accomplished.

It is my intention to cover all modifications of the invention falling within the spirit and scope of the following claims.

I claim:

1. In a tender, the combination of a tender frame, a truck supporting said frame adjacent one end thereof, said truck having spaced side frames, and a transverse member connecting said side frames, spaced pairs of wheels disposed inwardly of said side frames, a brake cylinder supported on said tender frame adjacent one end thereof and provided with a piston rod, a cylinder lever pivotally connected adjacent the outer end thereof to said piston rod and being pivoted intermediate its ends to said tender frame, an equalizing lever, a pull rod connected to the inner end of said cylinder lever and to the equalizing lever intermediate the ends thereof, brake beams disposed between the pairs of wheels and linked to said truck adjacent the ends of said beams and intermediate the ends thereof, brake shoes carried by said beams for braking cooperation with said wheels, live brake levers pivotally connected to one of said brake beams intermediate the ends of said lever, the upper ends of said levers being pivotally connected to pull rods pivotally connected to the ends of said equalizing lever, dead truck levers pivotally mounted at the upper ends thereof to said truck and intermediate the ends thereof to the other of said brake beams, and push rods pivotally connecting the lower ends of said dead and live brake levers.

2. In a tender, the combination of a tender frame, a truck supporting said frame adjacent one end thereof, said truck having spaced side frames and a transverse member connecting said side frames, spaced pairs of wheels disposed inwardly of said side frames, a brake cylinder supported on said tender frame adjacent one side thereof and provided with a piston rod, a horizontally disposed cylinder lever pivotally connected adjacent the outer end thereof to said piston rod and being pivoted intermediate its ends to said tender frame, a horizontally disposed equalizing lever, a pull rod connected to the inner end of said cylinder lever and to the equalizing lever intermediate the ends thereof, brake beams disposed between the pairs of wheels and linked to said truck adjacent the ends of said beams and intermediate the ends thereof, brake shoes carried by said beams for braking cooperation with said wheels, live brake levers pivotally connected to one of said brake beams intermediate the ends of said lever, the upper ends of said levers being pivotally connected to pull rods disposed above the wheel centers and pivotally connected to the ends of said equalizing lever, dead truck levers pivotally mounted at the upper ends thereof to said truck and intermediate the ends thereof to the other of said brake beams, and push rods pivotally connecting the lower ends of said dead and live brake levers.

3. In a tender, the combination of a tender frame, a truck supporting said frame adjacent one end thereof, said truck having spaced side frames and a transverse member connecting said side frames, spaced pairs of wheels disposed inwardly of said side frames, a brake cylinder supported on said tender frame adjacent one side thereof and provided with a piston rod, a horizontally disposed cylinder lever pivotally connected adjacent the outer end thereof to said piston rod and being pivoted intermediate its ends to said tender frame, a horizontally disposed equalizing lever, a pull rod connected to the inner end of said cylinder lever and to the equalizing lever intermediate the ends thereof, brake beams disposed between the pairs of wheels and linked to said truck adjacent the ends of said beams and intermediate the ends thereof, brake shoes carried by said beams for braking cooperation with said wheels, live brake levers pivotally connected to one of said brake beams intermediate the ends of said lever, the upper ends of said levers being pivotally connected to pull rods disposed above the wheel centers and pivotally connected to the ends of said equalizing lever, dead truck levers pivotally mounted at the upper ends thereof to said truck and intermediate the ends thereof to the other of said brake beams, push rods pivotally connecting the lower ends of said dead and live brake levers, and safety supports underlying said push rods and connected to said transverse members.

4. In a tender, the combination of a tender frame, a truck supporting said frame adjacent one end thereof, said truck having spaced side frames and a transverse member connecting said side frames, spaced pairs of wheels disposed inwardly of said side frames, a brake cylinder supported on said tender frame adjacent one side thereof and provided with a piston rod, a horizontally disposed cylinder lever pivotally connected adjacent the outer end thereof to said piston rod and being pivoted intermediate its ends to said tender frame, a horizontally disposed equalizing lever, a pull rod connected to the inner end of said cylinder lever and to the equalizing lever intermediate the ends thereof, brake beams disposed between the pairs of wheels and linked to said truck adjacent the ends of said beams and intermediate the ends thereof, brake shoes carried by said beams for braking cooperation with said wheels, live brake levers pivotally connected to one of said brake beams intermediate the ends of said lever, the upper ends of said levers being pivotally connected to pull rods pivotally connected to the ends of said equalizing lever, dead truck levers pivotally mounted at the upper ends thereof to said truck and intermediate the ends thereof to the other of said brake beams, and push rods pivotally connecting the lower ends of said dead and live brake levers.

5. In a tender, the combination of a tender frame, a truck supporting said frame adjacent one end thereof, said truck having spaced side frames and a transverse member connecting said side frames, spaced pairs of wheels disposed inwardly of said side frames, a brake cylinder supported on said tender frame adjacent one side thereof and provided with a piston rod, a horizontally disposed cylinder lever pivotally connected adjacent the outer end thereof to said piston rod and being pivoted intermediate its ends to said tender frame, a horizontally disposed equalizing lever, a pull rod connected to the inner end of said cylinder lever and to the equalizing lever intermediate the ends thereof, brake beams disposed between the pairs of wheels and linked to said truck adjacent the ends of said beams and intermediate the ends thereof, brake shoes carried by said beams for braking cooperation with said wheels, live brake levers pivotally connected to one of said brake beams intermediate the ends of said lever, the upper ends of said levers being pivotally connected to pull rods pivotally connected to the ends of said equalizing lever, dead truck levers pivotally mounted at the upper ends thereof to said truck and intermediate the ends thereof to the other of said brake beams, push rods pivotally connecting the lower ends of said dead and live brake levers, and safety supports underlying said push rods and connected to said transverse members.

6. In brake mechanism, truck structure comprising side frames, a transverse truck member connecting the frames, a plurality of pairs of wheels, brake beams supported from the transverse truck member at each end and intermediate thereof, brake levers connected to each brake beam at the ends, a rod connecting the lower ends of the brake levers between adjacent wheels, and means for guiding the rod attached to the transverse truck member.

7. In a brake mechanism for locomotive tenders, oppositely arranged brake cylinders secured to the tender frame, a pair of vertical levers associated with each pair of wheels and fulcrumed at an intermediate point to a brake beam, said brake beam being supported at its midpoint by a balance hanger, and at its ends by brake hangers through the medium of brake heads.

8. In a brake mechanism for locomotive tenders, oppositely arranged brake cylinders secured to the tender frame, a pair of vertical levers associated with each pair of wheels and fulcrumed at an intermediate point to a brake beam, said brake beam being supported at its midpoint by a balance hanger, and at its ends by brake hangers through the medium of brake heads, said vertical levers being secured together at their lower ends by an adjustable connecting rod.

9. In a brake mechanism for locomotive tenders, oppositely arranged brake cylinders secured to the tender frame, a pair of vertical levers associated with each pair of wheels and fulcrumed at an intermediate point to a brake beam, said brake beam being supported at its midpoint by a balance hanger, and at its ends by brake hangers through the medium of brake heads, said vertical levers being secured together at their lower ends by an adjustable connecting rod, and a looped bracket secured to the said frame, forming a guide for said connecting rod and an emergency safety support.

WALTER H. BASELT.